(12) United States Patent
Mukoyama et al.

(10) Patent No.: US 9,006,146 B2
(45) Date of Patent: Apr. 14, 2015

(54) SUPERCONDUCTING CABLE

(75) Inventors: Shinichi Mukoyama, Tokyo (JP); Masashi Yagi, Tokyo (JP); Tokui Yonemura, Chiba (JP); Shuka Yonemura, legal representative, Chiba (JP); Tomoya Nomura, Tokyo (JP)

(73) Assignees: Furukawa Electric Co., Ltd., Tokyo (JP); International Superconductivity Technology Center, Tokyo (JP)

( * ) Notice: Subject to any disclaimer, the term of this patent is extended or adjusted under 35 U.S.C. 154(b) by 103 days.

(21) Appl. No.: 13/696,228

(22) PCT Filed: May 9, 2011

(86) PCT No.: PCT/JP2011/060630
§ 371 (c)(1),
(2), (4) Date: Nov. 5, 2012

(87) PCT Pub. No.: WO2011/142303
PCT Pub. Date: Nov. 17, 2011

(65) Prior Publication Data
US 2013/0196857 A1  Aug. 1, 2013

(30) Foreign Application Priority Data

May 10, 2010 (JP) .................................. 2010-108277

(51) Int. Cl.
*H01B 12/00* (2006.01)
*H01F 6/00* (2006.01)
*H01L 39/00* (2006.01)
*H01B 12/02* (2006.01)
*C01G 3/00* (2006.01)
*H01B 7/02* (2006.01)

(52) U.S. Cl.
CPC ........ *H01B 12/02* (2013.01); *C01G 3/00* (2013.01); *C01P 2006/40* (2013.01); *H01B 7/02* (2013.01); *Y02E 40/641* (2013.01)

(58) Field of Classification Search
CPC . H01L 39/143; H01L 39/248; H01L 39/2419; H01L 39/2461
See application file for complete search history.

(56) References Cited

FOREIGN PATENT DOCUMENTS

| CN | 101142637 A | 3/2008 |
| JP | 57 32445 | 7/1982 |
| JP | 7 254312 | 10/1995 |

(Continued)

OTHER PUBLICATIONS

International Preliminary Report on Patentability issued Nov. 13, 2012 in PCT/JP2011/060630 filed May 9, 2011 submitting English translation only.

(Continued)

*Primary Examiner* — Colleen Dunn
(74) *Attorney, Agent, or Firm* — Oblon, McClelland, Maier & Neustadt, L.L.P.

(57) ABSTRACT

An AC superconducting cable with an insulating layer on the external circumference of a conductor, and wherein: the insulating layer includes a first insulating layer, a second insulating layer and a third insulating layer, from the inside layer to the outside layer; the insulating layer is impregnated with liquid nitrogen; the product of the dielectric constant ∈1 of the first insulating layer and the dielectric loss tangent tan δ1 and the product of the dielectric constant ∈2 of the second insulating layer and the dielectric loss tangent tan δ2 fulfilling the relationship ∈1×tan δ1>∈2×tan δ2; and the product of the dielectric constant ∈2 of the second insulating layer and the dielectric loss tangent tan δ2 and the product of the dielectric constant ∈3 of the third insulating layer and the dielectric loss tangent tan δ3 fulfilling the relationship ∈2×tan δ2<∈3×tan δ3.

8 Claims, 4 Drawing Sheets

(56) References Cited

FOREIGN PATENT DOCUMENTS

| JP | 2001 52542 | 2/2001 |
| JP | 2006 156163 | 6/2006 |
| JP | 2006 156328 | 6/2006 |

OTHER PUBLICATIONS

International Preliminary Report on Patentability issued Dec. 10, 2012 in PCT/JP2011/060630 filed May 9, 2011 submitting English translation only.

Written Opinion issued Aug. 16, 2011 in PCT/JP2011/060630 filed May 9, 2011 with English language translation.

International Search Report Issued Aug. 16, 2011 in PCT/JP11/060630 Filed May 9, 2011.

Combined Office Action and Search Report issued Apr. 29, 2014 in Chinese Patent Application No. 201180019551.7 (with English translation).

Chinese Office Action issued in Application No. CN 201180019551.7 on Sep. 29, 2014 (w/ English Translation).

Office Action issued in Chinese Application No. 201180019551.7 on Jan. 27, 2015 (w/partial English translation).

SUPERCONDUCTING CABLE

TECHNICAL FIELD

The present invention relates to a superconducting cable.

BACKGROUND ART

A superconducting cable is attracting attention as a new electric power cable which is compact and is able to transmit a large amount of electric power with low loss. The superconducting cable generally includes a superconducting conductor layer, an insulating layer and a superconducting shield layer being layered around a flexible former in order. The superconducting conductor layer is configured by winding a plurality of tape shaped oxide superconducting wires. The insulating layer is configured by winding an insulating tape. The superconducting shield layer is configured by winding a plurality of tape shaped oxide superconducting wires.

Patent Document 1 discloses a superconducting cable wherein a superconducting conductor layer $3a$, an insulating layer $51a$, a superconducting shield layer $7a$ and the like are layered around a former $1a$ in order as shown in FIG. 4. A yttrium based oxide superconducting wire rod such as $Y_1Ba_2Cu_3O_{7-x}$ ($0 \leq X < 1$) is used as the tape shaped oxide superconducting wire rod for the superconducting conductor layer $3a$, for example.

The insulating layer $51a$ is configured by winding insulating paper such as synthetic paper, semisynthetic insulating paper or kraft paper. The insulating layer $51a$ holds liquid nitrogen inside the insulating paper and in gaps (bad gap) between the sheets of the insulating paper when the superconducting cable is cooled by liquid nitrogen.

The numerical expression 1 represents electric field distribution in the insulating layer $51a$ which is formed of a uniform insulating material.

The withstand voltage performance of the insulating layer $51a$ needs to be higher than the maximum electric field in the insulating layer $51a$. According to the following expression 1, the electric field in the insulating layer $51a$ reaches the maximum when $r=r1$. As for insulation design, the superconducting cable is designed so that the maximum electric field in the insulating layer $51a$ is lower than the withstand voltage performance thereof.

[Numerical Expression 1]

$$E = \frac{V}{r \ln(r_2/r_1)} \quad (1)$$

(V: voltage, r: radius, $r_1$: inner radius of insulating layer, $r_2$: outer radius of insulating layer)

On the other hand, Patent Document 2 discloses a configuration of an insulating layer which is called grading. Unlike the insulating layer described in Patent Document 1 which is formed of the uniform insulating material, an insulating layer of grading has two layers. Among the two insulating layers, dielectric constant $\in_1$ of the inner insulating layer is high and dielectric constant $\in_2$ of the outer insulating layer is low.

By making the dielectric constant $\in_1$ of the inner insulating layer high and the dielectric constant $\in_2$ of the outer insulating layer low, it is possible to realize high withstand voltage performance considering AC characteristics.

The numerical expression 2 represents boundary voltage Va between the inner insulating layer and the outer insulating layer.

The voltage $\Delta V$ applied to the inner insulating layer is (V−Va). The voltage $\Delta V$ is small because the dielectric constant $\in_1$ of the inner insulating layer is made to be high and the dielectric constant $\in_2$ of the outer insulating layer is made to be low ($\in_1 > \in_2$). As a result, the grading has an effect of alleviating (lowering) the inner electric field. Therefore, the maximum electric field directly on the conductor can be lowered to realize high withstand voltage performance.

[Numerical Expression 2]

$$V_a = \frac{\frac{V}{\varepsilon_2} \ln\left(\frac{r_2}{r_a}\right)}{\frac{1}{\varepsilon_1} \ln\left(\frac{r_a}{r_1}\right) + \frac{1}{\varepsilon_2} \ln\left(\frac{r_2}{r_a}\right)} \quad (2)$$

$\in_1$: dielectric constant of inner insulating layer
$\in_2$: dielectric constant of outer insulating layer
$r_1$: inner radius of inner insulating layer
$r_2$: outer radius of outer insulating layer
$r_a$: radius of border part between inner insulating layer and outer insulating layer

PRIOR ART DOCUMENTS

Patent Documents

Patent Document 1: Japanese Patent Application Laid Open Publication No. 2006-156163
Patent Document 2: Japanese Patent Application Laid Open Publication No. 2006-156328

DISCLOSURE OF THE INVENTION

Problems to be Solved by the Invention

AC current and AC voltage need to be applied so as to transmit AC power through a cable such as a superconducting cable which has an insulating layer. When AC voltage is applied to a superconducting cable, dipoles which are electrically polarized due to the voltage oscillate in accordance with the fluctuation in electric field inside the insulating layer. When the dipoles oscillate in delayed fashion at this time, dielectric loss occurs. Dielectric loss tangent tan δ can be used as a value expressing the dielectric loss caused by this phase difference.

The dielectric loss of the superconducting cable is represented by the following numerical expressions 3 and 4.

[Numerical Expression 3]

$$W = 2\pi \cdot f \cdot C \frac{E^2}{3} \tan\delta \quad (3)$$

[Numerical Expression 4]

$$C = \frac{2\pi\varepsilon}{\ln\left(\frac{r_2}{r_1}\right)} \quad (4)$$

(f: frequency, C: capacitance, E: cable voltage, C: capacitance)

The above expressions 3 and 4 indicate that it is only necessary to select an insulating material which has small dielectric constant $\in$ and dielectric loss tangent tan δ at the operation temperature of the superconducting cable (liquid nitrogen temperature: around 70-77K) to realize a superconducting cable with small dielectric loss.

Table 1 shows insulating materials which are usually used as an insulating layer of a superconducting cable. The table also shows dielectric constant $\in$, dielectric loss tangent tan δ and material cost of each insulating material. Each value of dielectric constant and dielectric loss tangent is a value under liquid nitrogen impregnation (atmospheric pressure 77K).

gaps are generated in the insulating layer, which causes voids with low dielectric strength. This leads to a problem of electrical breakdown even in a case of low voltage being applied. Besides this, using nonwoven fabric for the insulating layer has a cost problem.

The above table 1 further indicates that (4) when a plastic film is used as the insulating layer, the application is difficult due to its characteristics of dielectric constant $\in$ and dielectric loss tangent δ and the cost. In each case of polyimide resin, Nylon (registered trademark) which is a polyamide synthetic fiber, and vinyl chloride resin, there is a problem that the dielectric loss is large because both of dielectric constant $\in$

TABLE 1

|  | (1)KRAFT PAPER | (2)SEMISYNTHETIC PAPER POLYPROPYLENE LAMINATED PAPER | (3) PLASTIC NONWOVEN FABRIC | | |
|---|---|---|---|---|---|
|  |  |  | (3-1) POLYETHYLENE | (3-2) POLYPROPYLENE | (3-3) POLYSTYRENE |
| $\in$ | 2.5 | 2.1 | 2.3 | 2.2 | 2.4 |
| tan δ [%] | 0.14 | 0.08 | 0.01 | 0.01 | 0.02 |
| $\in$ × tan δ [%] | 0.35 | 0.168 | 0.023 | 0.022 | 0.048 |
| COST | LOW | MIDDLE | HIGH | HIGH | HIGH |

| | (4) PLASTIC FILM | | | | |
|---|---|---|---|---|---|
|  | (4-1)FLUORORESIN (TEFLON) | (4-2)ABS RESIN | (4-3)POLYIMIDE RESIN | (4-4)POLYAMIDE SYNTHETIC FIBER (NYLON) | (4-5)VINYL CHLORIDE RESIN |
| $\in$ | 2.1 | 3 | 3.3 | 3.3 | 4.8 |
| tan δ [%] | 0.005 | 0.05 | 0.28 | 2 | 1.9 |
| $\in$ × tan δ [%] | 0.01 | 0.15 | 0.924 | 6.6 | 9.12 |
| COST | EXTRA HIGH | HIGH | HIGH | MIDDLE | LOW |

Each of the insulating materials described in the table 1 individually has electrical breakdown strength of 40 to 50 kV/mm as a simple body. However, when the insulating material is wound to form an insulating layer of a superconducting cable, the insulating layer is formed by being impregnated with liquid nitrogen (dielectric constant 1.43 (atmospheric pressure 77K)). In the case of such a superconducting cable, high withstand voltage performance cannot be realized because high electric field is applied to the liquid nitrogen in the bad gaps of the insulating layer when the dielectric constant $\in$ of the insulating layer is small.

The above table 1 indicates that (1) when kraft paper is used as the insulating layer, high withstand voltage performance can be realized because the dielectric constant is large; however, there is a problem that the dielectric loss is large because both of the dielectric constant $\in$ and dielectric loss tangent δ are large.

The above table 1 further indicates that (2) when semisynthetic paper (polypropylene laminated paper: composite tape material of kraft paper and plastic film) is used as the insulating layer, dielectric constant and dielectric loss tangent δ are relatively preferable; however, high withstand voltage performance cannot be realized due to the small dielectric constant $\in$.

The above table 1 further indicates that (3) when plastic nonwoven fabric (nonwoven fabric made of plastic fiber) is used as the insulating layer, dielectric constant $\in$ and dielectric loss tangent δ of the nonwoven fabric itself are preferable; however, in a case where the nonwoven fabric is used as an insulating layer or the nonwoven fabric forms a large part of the insulating layer, the nonwoven fabric wrinkles when the superconducting cable is bent because the nonwoven fabric is an elastic material. When the insulating layer is wrinkled, and dielectric loss tangent δ are large. In each case of Teflon (registered trademark) which is a fluororesin and ABS resin, although dielectric constant $\in$ and dielectric loss tangent δ are relatively preferable, there is a great cost problem and, furthermore, high withstand voltage performance cannot be realized because dielectric constant $\in$ is small.

The cost evaluated here means a price of the constituent material itself.

The object of the present invention is to provide a superconducting cable with high withstand voltage performance which can suppress dielectric loss at a low material cost.

Means for Solving the Problem

The present invention provides a superconducting cable with an insulating layer around an external circumference of a conductor, and which is characterized by the insulating layer having at least three layers formed by a first insulating layer, a second insulating layer and a third insulating layer respectively from an inside layer to an outside layer, the insulating layer being impregnated with liquid nitrogen, the product of the dielectric constant $\in 1$ and the dielectric loss tangent tan δ1 of the first insulating layer and a product of the dielectric constant $\in 2$ and the dielectric loss tangent tan δ2 of the second insulating layer fulfilling the relationship $\in 1 \times \tan \delta 1 > \in 2 \times \tan \delta 2$, and the product of the dielectric constant $\in 2$ and the dielectric loss tangent tan δ2 of the second insulating layer and a product of the dielectric constant $\in 3$ and the dielectric loss tangent tan δ3 of the third insulating layer fulfilling the relationship $\in 2 \times \tan \delta 2 < \in 3 \times \tan \delta 3$.

Effect of the Invention

The present invention can provide a superconducting cable with high withstand voltage performance which can suppress dielectric loss at a low material cost.

BEST MODE FOR CARRYING OUT THE INVENTION

A configuration of a superconducting cable in the embodiment will be described in detail using the drawings. The embodiment is an example and the present invention shall not be limited to this.

Figure 1:
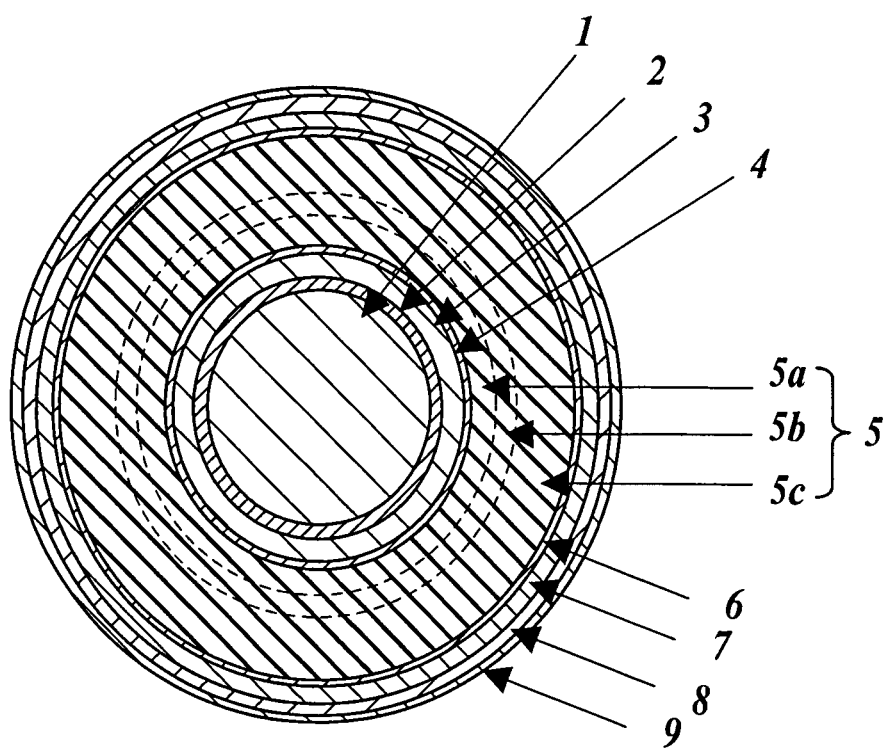
FIG. 1 is an outline sectional view of a superconducting conductor.

FIG. 1 illustrates an outline sectional view of a superconducting cable 10.

The superconducting cable 10 includes a former 1, a smooth layer 2, a superconducting conductor layer 3, an inner semiconducting layer 4, an insulating layer 5, an outer semiconducting layer 6, a superconducting shield layer 7, a shield protective layer 8 and an insulating protective layer 9.

The smooth layer 2 is formed on the surface of the former 1 which is a copper stranded wire conductor which is flexible and 30 mm in diameter. The superconducting conductor layer 3 is formed outside the smooth layer 2 by winding 20 tape shaped superconducting wires spirally around the smooth layer 2 with a pitch of 300 mm. Here, the superconducting wire is YBCO wire rod and the section size thereof is 4 mm in width and 0.2 mm in thickness for example. The inner semiconducting layer 4 is formed around the surface of the superconducting conductor layer 3 by winding a tape shaped carbon paper with an approximately 1 mm gap. The inner semiconducting layer 4 has a role of alleviating the electric field concentrations at corners of the YBCO wire rod on the conductor surface and at projections on the surface. The insulating layer 5 is formed around the inner semiconducting layer 4.

The insulating layer 5 includes a first insulating layer 5a, a second insulating layer 5b and a third insulating layer 5c, the first to third insulating layers (5a-5c) being layered from the inside layer to the outside layer in order.

The first insulating layer 5a is formed by winding 20 sheets of composite polypropylene laminated paper (20 mm in width and 0.15 mm in thickness) spirally and continuously around the inner semiconducting layer 4 with a 1 mm gap. Each of the composite polypropylene laminated paper is formed by polypropylene paper being sandwiched between kraft paper. The thickness of the first insulating layer 5a is desirably equal to or less than ¼ of the entire thickness of the insulating layer 5. That is because the dielectric loss increases when the thickness of the first insulating layer 5a exceeds ¼ of the entire thickness of the insulating layer 5.

Although polypropylene laminated paper is used for the first insulating layer 5a in the examples of the embodiment, the configuration is not limited to this. The first insulating layer 5a may consist of only kraft paper, for example.

Here, the first insulating layer 5a only has to have dielectric loss tangent tan δ1 which is equal to or more than 0.05% and dielectric constant ∈1 which is equal to or more than 1.0. When the dielectric loss tangent tan δ1 is less than 0.05%, the withstand voltage characteristic becomes worse. Also, the dielectric loss tangent tan δ1 is preferably equal to or less than 0.2%. When the dielectric loss tangent tan δ1 exceeds 0.2%, there is a problem that the dielectric loss increases. In addition, the product of the dielectric constant ∈1 and the dielectric loss tangent tan δ1 is preferably equal to or more than 0.1% and less than 0.4%. When the product of the dielectric constant ∈1 and the dielectric loss tangent tan δ1 is less than 0.1%, there is a problem that the withstand voltage characteristic becomes worse. When the product of the dielectric constant ∈1 and the dielectric loss tangent tan δ1 exceeds 0.4%, there is a problem that the dielectric loss increases.

Although polyethylene laminated paper is used for the first insulating layer 5a in the examples of the embodiment, the configuration is not limited to this. The first insulating layer 5a may consist of only kraft paper, for example.

Here, the first insulating layer 5a only has to have dielectric loss tangent tan δ1 which is equal to or more than 0.05% and dielectric constant ∈1 which is equal to or more than 1.0. When the dielectric loss tangent tan δ1 is less than 0.05%, the withstand voltage characteristic becomes worse. Also, the dielectric loss tangent tan δ1 is preferably equal to or less than 0.2%. When the dielectric loss tangent tan δ1 exceeds 0.2%, there is a problem that the dielectric loss increases. In addition, the product of the dielectric constant ∈1 and the dielectric loss tangent tan δ1 is preferably equal to or more than 0.1% and less than 0.4%. When the product of the dielectric constant ∈1 and the dielectric loss tangent tan δ1 is less than 0.1%, there is a problem that the withstand voltage characteristic becomes worse. When the product of the dielectric constant ∈1 and the dielectric loss tangent tan δ1 exceeds 0.2%, there is a problem that the dielectric loss increases.

The second insulating layer 5b is formed by winding 20 sheets of nonwoven fabric, each of which is 20 mm in width and 0.15 mm in thickness, spirally and continuously around the first insulating layer 5a with 1 mm gap. The nonwoven fabric is formed of Teflon (registered trademark) fiber, polystyrene fiber, polyethylene nonwoven fabric, polypropylene fiber or the like adhering to or intertwining with one another by thermal, mechanical or chemical action. For example, Tyvek (registered trademark) can be used as the nonwoven fabric. The thickness of the second insulating layer 5b is in the range of ⅒ to ⅓ of the entire thickness of the insulating layer 5, and preferably in the range of ⅕ to ¼. The above thickness of the second insulating layer 5b allows the insulating layer to be inexpensive. The thickness of the second insulating layer 5b is desirably equal to or less than 5 mm. When the thickness of the second insulating layer 5b exceeds 5 mm, the material cost increases, which is not preferable.

Here, the second insulating layer 5b only has to have dielectric loss tangent tan δ2 which is equal to or less than 0.02% and dielectric constant ∈2 which is equal to or more than 1.0. When the dielectric loss tangent tan δ2 exceeds 0.02%, there is a problem that the dielectric loss increases. Also, the product of the dielectric constant ∈2 and the dielectric loss tangent tan δ2 is preferably equal to or less than 0.04%. When the product of the dielectric constant ∈2 and the dielectric loss tangent tan δ2 exceeds 0.04%, there is a problem that the dielectric loss increases.

The second insulating layer 5b is desirably calendered to perform densification.

The third insulating layer 5c is formed by winding 66 sheets of polypropylene laminated paper, each of which is 20 mm in width and 0.15 mm in thickness, around the second insulating layer 5b like the first insulating layer 5a. The third insulating layer 5c is also not limited to polypropylene laminated paper. The thickness of the third insulating layer 5c is the thickness obtained by subtracting the thickness of the first insulating layer 5a and the second insulating layer 5b from the entire thickness of the insulating layer 5.

Here, the third insulating layer 5c only has to have dielectric loss tangent tan δ3 which is more than 0.02% and dielectric constant ∈3 which is equal to or more than 1.0. When the dielectric loss tangent tan δ3 is equal to or less than 0.02%, there is a problem that the withstand voltage characteristic becomes worse. Also, the product of the dielectric constant ∈3 and the dielectric loss tangent tan δ3 is preferably more than 0.04% and equal to or less than 0.3%. When the product of the dielectric constant ∈3 and the dielectric loss tangent tan δ3 is less than 0.04%, there is a problem that the withstand voltage characteristic becomes worse. When the product of the dielectric constant ∈3 and the dielectric loss tangent tan δ3 exceeds 0.3%, there is a problem that the dielectric loss increases.

Figure 2:
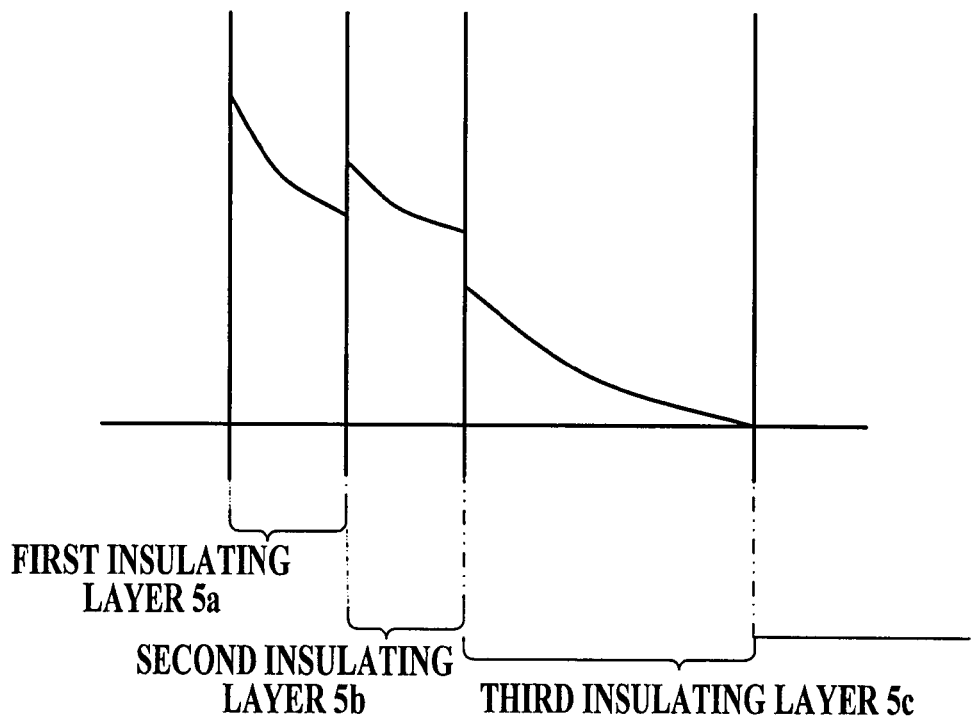
FIG. 2 is a view showing an electric field distribution inside the insulating layer.

FIG. 2 shows the electric field distribution inside the insulating layer 5.

Generally, the electric field concentrates inside the second insulating layer 5b because the dielectric constant ∈ is small. However, the increase in the electric field of the second insulating layer 5b is smaller than that of the first insulating layer 5a because the second insulating layer 5b is thinner with respect to the entire thickness of the insulating layer 5. Therefore, the insulating layer 5 does not lose the voltage performance as a whole even when the second insulating layer 5b is formed by using synthetic paper and the like which has low withstand voltage performance.

Referring back to FIG. 1, the outside configuration of the insulating layer 5 will be explained as a configuration example though the outside configuration of the insulating layer 5 is not the subject of the present invention. An outer semiconducting layer 6 is formed around the insulating layer 5. Furthermore, a superconducting shield layer 7 is formed by winding 30 superconducting wires around the outer semiconducting layer 6. The material, size and winding method of the superconducting wires which are used for the superconducting shield layer 7 are the same as in the superconducting conductor layer 3. Then, a shield protective layer 8 is formed around the surface of the superconducting shield layer 7. The shield protective layer 8 is formed by winding copper tape in a plurality of layers. The shield protective layer 8 has a role of protecting the superconducting wires of the superconducting shield layer 7 and protecting the conductor by shunt current when excess electric current flows through the shield layer. An insulating protective layer 9 which is 1 mm in thickness is formed around the shield protective layer 8. The insulating protective layer 9 is formed by spirally winding tape shaped kraft paper in four layers around the shield protective layer 8 with an approximately 1 mm gap, and has a role of providing electrical insulation between the cable core and a heat insulation tube.

The first experiment will be explained with reference to Table. 2.

In the first experiment, 275 kV level AC voltage is applied to the superconducting cable 10 which includes the three layered insulating layer 5 according to the embodiment and to comparison examples.

As experimental results, the maximum electric field, dielectric loss and electrical breakdown strength of each layer (5a-5c) of the insulating layer 5 are obtained.

Here, the maximum electric field indicates where the voltage gradient per 1 mm in the insulator which forms the insulating layer is highest. The dielectric loss is obtained by measuring the dielectric constant and the dielectric loss tangent. Electrical breakdown strength is obtained by confirming the presence of electrical breakdown and partial discharge when the AC voltage of 275 kV is applied. In this assessment, A is a case where there is no electrical breakdown or partial discharge when the AC voltage is applied, B is a case where there is a partial discharge and C is a case where there are both electrical breakdown and partial discharge.

The example 1 is a superconducting cable which includes an insulating layer wherein the first insulating layer is polypropylene laminated paper, the second insulating layer is polyethylene nonwoven fabric and the third insulating layer is polypropylene laminated paper. Here, the first insulating layer 5a is 5 mm thick, the second insulating layer 5b is 5 mm thick and the third insulating layer 5c is 14 mm thick.

In each of the examples 2 to 9, insulating layers are formed by using insulating materials as described in Table 2 and thickness of each insulating layer is as described in Table 2.

In each of the examples 1 to 4, the first insulating layer and the third insulating layer are formed by using the same insulating material.

In each of the examples 5 to 7, the first insulating layer and the third insulating layer are formed of different insulating materials.

In the example 8, the first to third insulating layers of the embodiment are arranged respectively in the second to fourth layers, and an insulating material with large product of the dielectric constant ∈ and the dielectric loss tangent δ is arranged in the first layer.

In the example 9, the first to third insulating layers of the embodiment are arranged respectively in the first to third layers, and an insulating material with large product of the dielectric constant and the dielectric loss tangent δ is arranged in the fourth layer.

As comparative examples, same experiment was conducted to a superconducting cable which includes an insulating layer with large product of dielectric constant c and dielectric loss tangent δ (comparative example 1), a superconducting cable which includes an insulating layer with small product of dielectric constant c and dielectric loss tangent δ (comparative example 2), a superconducting cable which includes a two layered insulating layer using insulating layers of the comparative examples 1 and 2 (comparative example 3), and a superconducting cable which includes a three layered insulating layer wherein product of dielectric constant ∈ and dielectric loss tangent δ becomes smaller from the inside insulating layer to the outside insulating layer (comparative example 4). In the comparative example 3, the thickness of the inner insulating layer (first insulating layer) is 10 mm and the thickness of the outer insulating layer (second insulating layer) is 14 mm. In the comparative example 4, the thickness of the first insulating layer is 5 mm, the thickness of the second insulating layer is 5 mm and the thickness of the third insulating layer is 14 mm.

The thickness of the entire insulating layer is 24 mm in all of the examples 1 to 9 and the comparative examples 1 to 4.

TABLE 2

| | INSULATING LAYER | | INSULATING COMPONENT | ε tan δ [%] | INSULATION THICKNESS | MAXIMUM ELECTRIC FIELD | DIELECTRIC LOSS | ELECTRICAL BREAKDOWN STRENGTH | MATERIAL COST OF INSULATING LAYER |
|---|---|---|---|---|---|---|---|---|---|
| COMPARATIVE EXAMPLE 1 | ONE LAYER | | (2) POLYPROPYLENE LAMINATED PAPER | 0.168 | 24 mm | 10 kV/mm | 0.7 W/m | A | 5,000 ¥/m |
| COMPARATIVE EXAMPLE 2 | ONE LAYER | | (3-1) POLYETHYLENE NONWOVEN FABRIC | 0.023 | 24 mm | 10 kV/mm | 0.2 W/m | C | 24,000 ¥/m |
| COMPARATIVE EXAMPLE 3 | TWO LAYERS (FIRST LAYER) | | (2) POLYPROPYLENE LAMINATED PAPER | 0.168 | 10 mm | 10 kV/mm | 0.4 W/m | B | 16,000 ¥/m |
| | TWO LAYERS (SECOND LAYER) | | (3-1) POLYETHYLENE NONWOVEN FABRIC | 0.023 | 14 mm | 8 kV/mm | | | |
| COMPARATIVE EXAMPLE 4 | THREE LAYERS (FIRST LAYER) | FIRST INSULATING LAYER | (1) KRAFT PAPER | 0.35 | 5 mm | 10 kV/mm | 0.6 W/m | A | 15,500 ¥/m |
| | THREE LAYERS (SECOND LAYER) | SECOND INSULATING LAYER | (2) POLYPROPYLENE LAMINATED PAPER | 0.168 | 5 mm | 7 kV/mm | | | |
| | THREE LAYERS (THIRD LAYER) | THIRD INSULATING LAYER | (3-1) POLYETHYLENE NONWOVEN FABRIC | 0.023 | 14 mm | 6 kV/mm | | | |
| EXAMPLE 1 | THREE LAYERS (FIRST LAYER) | FIRST INSULATING LAYER | (2) POLYPROPYLENE LAMINATED PAPER | 0.168 | 5 mm | 10 kV/mm | 0.4 W/m | A | 9,000 ¥/m |
| | THREE LAYERS (SECOND LAYER) | SECOND INSULATING LAYER | (3-1) POLYETHYLENE NONWOVEN FABRIC | 0.023 | 5 mm | 8 kV/mm | | | |
| | THREE LAYERS (THIRD LAYER) | THIRD INSULATING LAYER | (2) POLYPROPYLENE LAMINATED PAPER | 0.168 | 14 mm | 6 kV/mm | | | |
| EXAMPLE 2 | THREE LAYERS (FIRST LAYER) | FIRST INSULATING LAYER | (1) KRAFT PAPER | 0.35 | 3 mm | 9 kV/mm | 0.4 W/m | B | 12,000 ¥/m |
| | THREE LAYERS (SECOND LAYER) | SECOND INSULATING LAYER | (3-1) POLYETHYLENE NONWOVEN FABRIC | 0.023 | 11 mm | 10 kV/mm | | | |
| | THREE LAYERS (THIRD LAYER) | THIRD INSULATING LAYER | (1) KRAFT PAPER | 0.35 | 10 mm | 4 kV/mm | | | |
| EXAMPLE 3 | THREE LAYERS (FIRST LAYER) | FIRST INSULATING LAYER | (2) POLYPROPYLENE LAMINATED PAPER | 0.168 | 5 mm | 10 kV/mm | 0.4 W/m | A | 15,000 ¥/m |
| | THREE LAYERS (SECOND LAYER) | SECOND INSULATING LAYER | (4-1) FLUORORESIN (TEFLON) FILM | 0.01 | 5 mm | 7 kV/mm | | | |
| | THREE LAYERS (THIRD LAYER) | THIRD INSULATING LAYER | (2) POLYPROPYLENE LAMINATED PAPER | 0.168 | 14 mm | 6 kV/mm | | | |
| EXAMPLE 4 | THREE LAYERS (FIRST LAYER) | FIRST INSULATING LAYER | (2) POLYPROPYLENE LAMINATED PAPER | 0.168 | 5 mm | 11 kV/mm | 0.5 W/m | A | 9,000 ¥/m |
| | THREE LAYERS (SECOND LAYER) | SECOND INSULATING LAYER | (3-3) POLYSTYRENE NONWOVEN FABRIC | 0.048 | 5 mm | 7 kV/mm | | | |
| | THREE LAYERS (THIRD LAYER) | THIRD INSULATING LAYER | (2) POLYPROPYLENE LAMINATED PAPER | 0.168 | 14 mm | 6 kV/mm | | | |
| EXAMPLE 5 | THREE LAYERS (FIRST LAYER) | FIRST INSULATING LAYER | (2) POLYPROPYLENE LAMINATED PAPER | 0.168 | 5 mm | 11 kV/mm | 0.6 W/m | B | 7,000 ¥/m |
| | THREE LAYERS (SECOND LAYER) | SECOND INSULATING LAYER | (3-1) POLYETHYLENE NONWOVEN FABRIC | 0.023 | 5 mm | 9 kV/mm | | | |
| | THREE LAYERS (THIRD LAYER) | THIRD INSULATING LAYER | (1) KRAFT PAPER | 0.35 | 14 mm | 5 kV/mm | | | |
| EXAMPLE 6 | THREE LAYERS (FIRST LAYER) | FIRST INSULATING LAYER | (3-3) POLYSTYRENE NONWOVEN FABRIC | 0.048 | 5 mm | 10 kV/mm | 0.4 W/m | C | 17,000 ¥/m |
| | THREE LAYERS (SECOND LAYER) | SECOND INSULATING LAYER | (4-1) FLUORORESIN (TEFLON) FILM | 0.01 | 5 mm | 8 kV/mm | | | |

TABLE 2-continued

| | INSULATING LAYER | | INSULATING COMPONENT | ε tan δ [%] | INSULATION THICKNESS | MAXIMUM ELECTRIC FIELD | DIELECTRIC LOSS | ELECTRICAL BREAKDOWN STRENGTH | MATERIAL COST OF INSULATING LAYER |
|---|---|---|---|---|---|---|---|---|---|
| | THREE LAYERS (THIRD LAYER) | THIRD INSULATING LAYER | (1) KRAFT PAPER | 0.35 | 14 mm | 5 kV/mm | | | |
| EXAMPLE 7 | THREE LAYERS (FIRST LAYER) | FIRST INSULATING LAYER | (2) POLYPROPYLENE LAMINATED PAPER | 0.168 | 5 mm | 10 kV/mm | 0.2 W/m | A | 33,000 ¥/m |
| | THREE LAYERS (SECOND LAYER) | SECOND INSULATING LAYER | (4-1) FLUORORESIN (TEFLON) FILM | 0.01 | 5 mm | 8 kV/mm | | | |
| | THREE LAYERS (THIRD LAYER) | THIRD INSULATING LAYER | (3-3) POLYSTYRENE NONWOVEN FABRIC | 0.048 | 14 mm | 5 kV/mm | | | |
| EXAMPLE 8 | FOUR LAYERS (FIRST LAYER) | FIRST INSULATING LAYER | (1) KRAFT PAPER | 0.35 | 5 mm | 10 kV/mm | 0.6 W/m | A | 9,000 ¥/m |
| | FOUR LAYERS (SECOND LAYER) | SECOND INSULATING LAYER | (2) POLYPROPYLENE LAMINATED PAPER | 0.168 | 5 mm | 7 kV/mm | | | |
| | FOUR LAYERS (THIRD LAYER) | THIRD INSULATING LAYER | (3-1) POLYETHYLENE NONWOVEN FABRIC | 0.23 | 5 mm | 7 kV/mm | | | |
| | FOUR LAYERS (FOURTH LAYER) | FOURTH INSULATING LAYER | (2) POLYPROPYLENE LAMINATED PAPER | 0.168 | 9 mm | 4 kV/mm | | | |
| EXAMPLE 9 | FOUR LAYERS (FIRST LAYER) | FIRST INSULATING LAYER | (2) POLYPROPYLENE LAMINATED PAPER | 0.168 | 5 mm | 10 kV/mm | 0.4 W/m | A | 7,500 ¥/m |
| | FOUR LAYERS (SECOND LAYER) | SECOND INSULATING LAYER | (3-1) POLYETHYLENE NONWOVEN FABRIC | 0.023 | 5 mm | 8 kV/mm | | | |
| | FOUR LAYERS (THIRD LAYER) | THIRD INSULATING LAYER | (2) POLYPROPYLENE LAMINATED PAPER | 0.168 | 5 mm | 7 kV/mm | | | |
| | FOUR LAYERS (FOURTH LAYER) | | (1) KRAFT PAPER | 0.35 | 9 mm | 4 kV/mm | | | |

As shown in Table 2, the examples 1 to 9 can both suppress the dielectric loss and realize an inexpensive insulating layer or high withstand voltage performance. Hereinafter, each example will be explained specifically.

The example 1 can realize high withstand voltage performance and suppress the dielectric loss to 0.4 W/m. In the example 1, the dielectric loss is reduced to approximately 70% of that in the comparative example 1. The example 1 can also suppress the costs by reducing the thickness of the expensive second insulating layer 5b to 5 mm. Even when AC voltage is applied, there is no problematic insulating phenomenon such as partial discharge, not to mention electrical breakdown.

On the other hand, the dielectric loss is high in the comparative example 1 compared to the example 1 and other comparative examples 2, 3 and 4.

In the comparative example 2, the maximum electric field is 10 kV/mm though the insulating layer has low withstand voltage performance, and thus the comparative example 2 is not preferable in terms of withstand voltage performance. Also, the comparative example 2 is costly though the dielectric loss is low.

The comparative example 3 is costly because as thick as 14 mm of an expensive insulating layer which has low dielectric constant $\in$ and dielectric loss tangent $\delta$ is used. Also, the outer insulating layer wrinkles when the superconducting cable is bent because Tyvek (registered trademark) which is an elastic nonwoven fabric is used for the outer insulating layer. Wrinkling of the insulating layer is not preferable because gaps are generated in the insulating layer, and voids with low dielectric strength occur, which leads to electrical breakdown even if the applied voltage is low.

The comparative example 4 has a three layer structure and the electrical breakdown strength is sufficient. However, the dielectric loss is slightly higher than that of the example 1 and the comparative examples 2 and 3. Furthermore, the comparative example 4 is costly.

The example 2 can suppress the dielectric loss to 0.4 W/m as in the case of the example 1. However, partial discharge occurs when AC voltage is applied. The example 2 can suppress the material costs compared to the comparative examples 2 to 4. The example 2 has dielectric loss and electrical breakdown strength similar to those of the comparative example 3. However, the example 2 has an advantage because the material cost can be suppressed more than the comparative example 3.

The example 3 can suppress the dielectric loss to 0.4 W/m as in the case of the example 1. Furthermore, partial discharge does not occur even when AC voltage is applied. The material cost of the example 3 is higher than the examples 1 and 2, but can be suppressed compared to the comparative examples 2 to 4.

The example 4 can suppress the dielectric loss to 0.5 W/m, and furthermore, no partial discharge occurs even when AC voltage is applied. The material cost is also similar to the example 1, which is preferable.

The example 5 has dielectric loss of 0.6 W/m which is slightly higher than that of the examples 1 to 4. Partial discharge also occurs when AC voltage is applied. However, the material cost can be suppressed compared to the examples 1 to 4. Though the example 5 has the dielectric loss similar to that of the comparative example 4, the electrical breakdown strength is slightly inferior. However, the material cost is half of that of the comparative example 4, which is preferable.

The example 6 can suppress the dielectric loss to 0.4 W/m. However, both of the electrical breakdown and partial discharge occur when AC voltage is applied. The material cost is higher than that of the examples 1 to 5, but can be reduced by 30% compared to the comparative example 2.

The example 7 can suppress the dielectric loss to 0.2 W/m and has no partial discharge even when AC voltage is applied. Although the material cost is high, the example 7 can realize the dielectric loss similar to that of the comparative example 2 and sufficient electrical breakdown strength, which are preferable.

The example 8 has dielectric loss of 0.6 W/m, which is slightly higher than that of the examples 1 to 4, 6 and 7. However, there is no partial discharge even when AC voltage is applied. The material cost can also be suppressed to be similar to the material cost of the examples 1 and 4. Though the dielectric loss and electrical breakdown strength are similar to those of the comparative example 4, the material cost can be reduced by 40%, which is preferable.

The example 9 can suppress the dielectric loss to 0.4 W/m and furthermore, no partial discharge occurs even when AC voltage is applied. In addition, material cost can also be suppressed to be lower than the material cost of the example 1, which is preferable.

Subsequently, preferable range of product of the dielectric constant $\in$ and the dielectric loss tangent $\tan \delta$ of each insulating layer in the examples 1 to 9 will be described.

A comparison between the example 1 and the examples 3 and 4 bespeaks that the reduction rate of dielectric loss is improved by making the product of dielectric constant $\in$ and dielectric loss tangent $\tan \delta$ ($\in 2 \times \tan \delta 2$) of the second insulating layer be equal to or less than 0.04%. The comparison also bespeaks that using fluororesin film as in the example 3 increases the material cost although the dielectric loss and electrical breakdown strength do not change when the value of $\in 2 \times \tan \delta 2$ is equal to or less than 0.04%.

A comparison between the examples 2 and 6 bespeaks that the electrical breakdown strength is improved by making the product of dielectric constant $\in$ and dielectric loss tangent $\tan \delta$ ($\in 1 \times \tan \delta 1$) of the first insulating layer be equal to or more than 0.1%.

A comparison between the examples 1 and 5 and a comparison between the examples 3 and 7 bespeak that the electrical breakdown strength is preferable when the product of dielectric constant $\in$ and dielectric loss tangent $\tan \delta$ ($\in 3 \times \tan \delta 3$) of the third insulating layer is equal to or less than 0.3%, and that the lower the value of $\in 3 \times \tan \delta 3$ is, the more the reduction of dielectric loss improves, as long as the value of $\in 3 \times \tan \delta 3$ is higher than the value of $\in 2 \times \tan \delta 2$.

A comparison between the examples 8 and 9 bespeaks that the dielectric loss reduction improves and the material cost can be reduced by arranging an insulating material with large product of the dielectric constant $\in$ and dielectric loss tangent $\delta$ in the fourth layer rather than in the first layer when a four layered insulating layer is formed.

An overall evaluation of the dielectric loss, electrical breakdown strength and material cost bespeaks that the examples 1, 4 and 9 are most preferable. That is, it is most preferable to use semisynthetic paper (polypropylene laminated paper) for the first insulating layer, to use plastic nonwoven fabric for the second insulating layer and to use the same material as the first insulating layer for the third insulating layer.

The relationship between the dielectric loss and thickness of the insulating layer will be explained with reference to FIG. 3.

Figure 3:
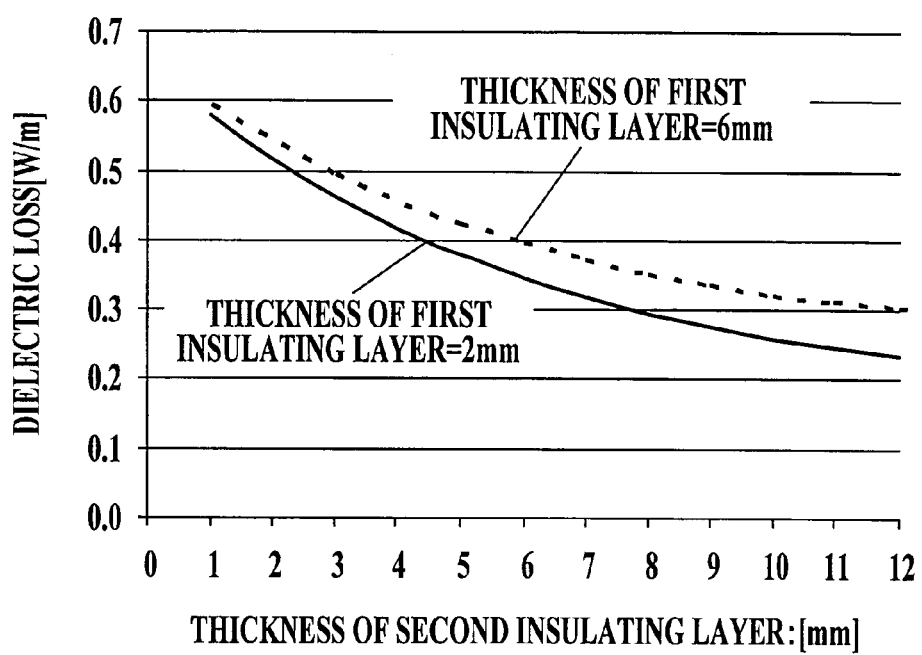
FIG. 3 is a view showing a value of dielectric loss.
Figure 4:
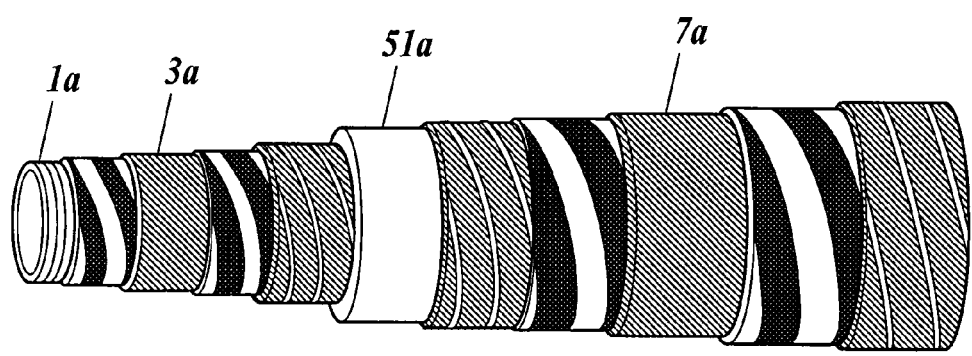
FIG. 4 is an outline configuration view of a conventional superconducting conductor.

FIG. 3 shows a value of dielectric loss when 275 kV level AC voltage is applied in each of the cases where the thicknesses of the first insulating layer 5a and the second insulating layer 5b of the superconducting cable 10 including the insulating layer 5 are changed according to the embodiment.

Although the dielectric loss reduces when the second insulating layer 5b becomes thicker, the reduction rate reduces from a point around 8 mm as shown in FIG. 3. On the other hand, too much use of the second insulating layer 5b is costly. The dielectric loss reduces when the first insulating layer 5a becomes thinner. However, whereas the maximum electric field of the second insulating layer 5b is 8 kV/mm when the first insulating layer 5a is 5 mm thick, the maximum electric field of the second insulating layer 5b becomes high to be approximately 9.5 kV/mm when the first insulating layer 5a is 2 mm thick, which becomes a factor for losing reliability in dielectric strength.

It can be seen from the above that there is a best range of thickness for each of the first insulating layer 5a and the second insulating layer 5b. That is, as for the range to bring out effect of the present configuration, when the insulating layer 5 is 24 mm thick, the first insulating layer 5a is to be 2 mm to 6 mm thick (thickness being equal to or thinner than ¼ of the entire insulating layer 5), the second insulating layer 5b is to be 2 mm to 8 mm thick (thickness being ¹⁄₁₀ to ⅓ of the entire insulating layer 5) and the third insulating layer 5c is to have the rest of the thickness.

As described above, the embodiment makes it possible to reduce the dielectric loss by the insulating layer 5 of the superconducting cable 10 having the three layer structure of grading. Furthermore, it is possible to keep the voltage distribution low in the second insulating layer 5b which has small dielectric loss tangent tan $\delta$ and low withstand voltage performance, and it is also possible to reduce the dielectric loss without impairing the withstand voltage performance of the entire superconducting cable 10 and making the insulating layer thick.

It is possible to make the entire insulating layer 5 have the same thickness as that of a conventional polyethylene laminated paper with high insulating performance, and thus compactness of the superconducting cable is not impaired.

It is also possible to reduce the dielectric loss to 80% of that of the superconducting cable made of polyethylene laminated paper and thus to reduce the transmission loss of the cable itself caused by the electric power transmission. Furthermore, it is possible to ease the required capability of refrigerator for removing the heat caused by the loss and thus to suppress the construction cost of the refrigeration system.

Although the second insulating layer 5b uses expensive nonwoven fabric, the thickness thereof can be suppressed. Thereby, the total system cost can be reduced.

The reliability in electric insulation is also similar to the reliability in the conventional insulating layers. Therefore, it is possible to avoid disorders in city functions and civic life functions which are caused by the stop of electric power transmission to urban areas due to the long use of cables and electrical breakdown in the cable, and thus it is possible to maintain the reliable social infrastructure.

The present invention can also be shown by electric characteristics without specifying the materials. The product of the dielectric constant $\in 1$ and the dielectric loss tangent tan $\delta 1$ of the first insulating layer and the product of the dielectric constant $\in 2$ and the dielectric loss tangent tan $\delta 2$ of the second insulating layer only have to fulfill the relationship $\in 1 \times \tan \delta 1 > \in 2 \times \tan \delta 2$, and the withstand voltage strength F1 of the first insulating layer and the withstand voltage strength F2 of the second insulating layer only have to fulfill the relationship F1>F2. The level of the dielectric constant shall not be limited. That is, the dielectric constant may have either the relationship of "the dielectric constant of the first insulating layer> the dielectric constant of the second insulating layer", or the relationship of "the dielectric constant of the first insulating layer< the dielectric constant of the second insulating layer". The product of the dielectric constant $\in 2$ and the dielectric loss tangent tan $\delta 2$ of the second insulating layer and the product of the dielectric constant $\in 3$ and the dielectric loss tangent tan $\delta 3$ of the third insulating layer only have to fulfill the relationship $\in 2 \times \tan \delta 2 < \in 3 \times \tan \delta 3$. There is no need for $\in 1 \times \tan \delta 1$ and $\in 3 \times \tan \delta 3$ to be the same as each other.

As a superconducting wire which is used for the superconducting conductor layer 3 and a superconducting shield layer 7, RE type superconducting wire rod such as YBCO wire rod and HoBCO wire rod, and Bi type superconducting wire rod which is Bi type superconductor such as Bi2223 applied with a silver sheath can be used. RE is a rare earth element and Re type superconducting material is a superconducting material which includes one or a plurality of kinds of elements selected from Y, Nd, Sm, Eu, Gd, Dy, Ho, Er, Tm, Yb and Lu.

INDUSTRIAL APPLICABILITY

The present invention can be used as a superconducting cable since it is configured as described above.

EXPLANATION OF REFERENCE NUMERALS 1 former
2 smooth layer
3 superconducting conductor layer
4 inner semiconducting layer
5 insulating layer
5a first insulating layer
5b second insulating layer
5c third insulating layer
6 outer semiconducting layer
7 superconducting shield layer
8 shield protective layer
9 insulating protective layer
10 superconducting cable

The invention claimed is:
1. A superconducting cable, comprising:
an insulating layer formed around an external circumference of a conductor, wherein
the insulating layer has at least three layers of a first insulating layer, a second insulating layer and a third insulating layer respectively from an inside layer to an outside layer, and the insulating layer is impregnated with liquid nitrogen,
a product of dielectric constant $\in 1$ and dielectric loss tangent tan $\delta 1$ of the first insulating layer and a product of dielectric constant $\in 2$ and dielectric loss tangent tan $\delta 2$ of the second insulating layer fulfill a relationship $\in 1 \times \tan \delta 1 > \in 2 \times \tan \delta 2$,
the product of dielectric constant $\in 2$ and dielectric loss tangent tan $\delta 2$ of the second insulating layer and a product of dielectric constant $\in 3$ and dielectric loss tangent tan $\delta 3$ of the third insulating layer fulfill a relationship $\in 2 \times \tan \delta 2 < \in 3 \times \tan \delta 3$,
the first insulating layer has a thickness which is equal to or less than ¼ of a thickness of an entire insulating layer,
the second insulating layer has a thickness which is in a range of ¹⁄₁₀ to ⅓ of the thickness of the entire insulating layer, and
the third insulating layer has a thickness which is obtained by subtracting the thickness of the first insulating layer and the thickness of the second insulating layer from the thickness of the entire insulating layer.

2. The superconducting cable according to claim 1 wherein the product of dielectric constant $\in 2$ and dielectric loss tangent tan δ2 of the second insulating layer is equal to or less than 0.04%.

3. The superconducting cable according to claim 1, wherein
the product of dielectric constant $\in 1$ and dielectric loss tangent tan δ1 of the first insulating layer is equal to or more than 0.1%,
the product of dielectric constant $\in 2$ and dielectric loss tangent tan δ2 of the second insulating layer is equal to or less than 0.04%, and
the product of dielectric constant $\in 3$ and dielectric loss tangent tan δ3 of the third insulating layer is more than 0.04% and equal to or less than 0.3%.

4. The superconducting cable according to claim 1, wherein
the first insulating layer is configured by winding a plurality of kraft paper sheets or layers of a composite tape material of kraft paper and plastic film,
the second insulating layer is configured by winding layers of a tape material formed of a nonwoven fabric made of plastic fiber, and
the third insulating layer is configured by winding a plurality of kraft paper sheets or layers of a composite tape material of kraft paper and plastic film.

5. The superconducting cable according to claim 4, wherein
the third insulating layer is the composite tape material of kraft paper and plastic film, and a plurality of kraft paper sheets are further wound around an external circumference of the third insulating layer.

6. The superconducting cable according to claim 4, wherein the nonwoven fabric made of plastic fiber constituting the second insulating layer is nonpolar plastic.

7. The superconducting cable according claim 4, wherein the nonwoven fabric made of plastic fiber constituting the second insulating layer is calendered to perform densification.

8. The superconducting cable according to claim 1, wherein
the second insulating layer has a thickness which is equal to or less than 5 mm.

* * * * *